US009065890B2

United States Patent
Filippov

(10) Patent No.: US 9,065,890 B2
(45) Date of Patent: Jun. 23, 2015

(54) WRIST-WORN MOBILE TELEPHONE

(76) Inventor: Sergei D. Filippov, Chelyabinsk (RU)

( * ) Notice: Subject to any disclaimer, the term of this patent is extended or adjusted under 35 U.S.C. 154(b) by 176 days.

(21) Appl. No.: 13/992,150

(22) PCT Filed: Dec. 5, 2011

(86) PCT No.: PCT/RU2011/000956
§ 371 (c)(1),
(2), (4) Date: Jun. 6, 2013

(87) PCT Pub. No.: WO2012/078077
PCT Pub. Date: Jun. 14, 2012

(65) Prior Publication Data
US 2013/0273984 A1      Oct. 17, 2013

(30) Foreign Application Priority Data

Dec. 6, 2010   (RU) .................................. 2010149515

(51) Int. Cl.
*H04M 1/00*       (2006.01)
*H04M 1/02*       (2006.01)
*H04M 1/12*       (2006.01)
*H04B 1/3827*     (2015.01)

(52) U.S. Cl.
CPC .............. *H04M 1/0202* (2013.01); *H04M 1/12* (2013.01); *H04B 1/385* (2013.01); *H04B 2001/3861* (2013.01)

(58) Field of Classification Search
CPC ................... A61B 2017/07221; A61B 5/6824; A61B 2017/2946; A61B 5/6831; A61M 5/14244; A41D 3/005; A44C 5/0007; A44C 5/20; B32B 2307/51; B32B 2457/00; B32B 3/04; B32B 9/045; E05B 75/00; E06B 9/322
USPC ................................ 455/556.1, 556.2; 368/10
See application file for complete search history.

(56) References Cited

U.S. PATENT DOCUMENTS

| | | | |
|---|---|---|---|
| 2009/0069045 A1* | 3/2009 | Cheng | 455/556.1 |
| 2009/0074224 A1* | 3/2009 | Wright | 381/385 |
| 2011/0026368 A1* | 2/2011 | Relyea | 368/10 |

* cited by examiner

*Primary Examiner* — Tu X Nguyen
(74) *Attorney, Agent, or Firm* — Alexander Rabinovich

(57) ABSTRACT

A wrist-worn mobile telephone is comprised of a body with a microphone and a speaker attached to a wristband and adapted to be movable around and along the wrist. The wristband can be resiliently stretchable and multi-sectional. The wristband can be made with a groove, and a holding clip attached to the body can be inserted into the groove. Alternatively, the phone can be made with a through slot to let the wristband be fed through the slot. In this version, an inner side of the body contacting the wrist can be shaped concave, and the through slot can be longitudinally shaped to generally follow the shape of the inner side, which can be made coarse.

6 Claims, 3 Drawing Sheets

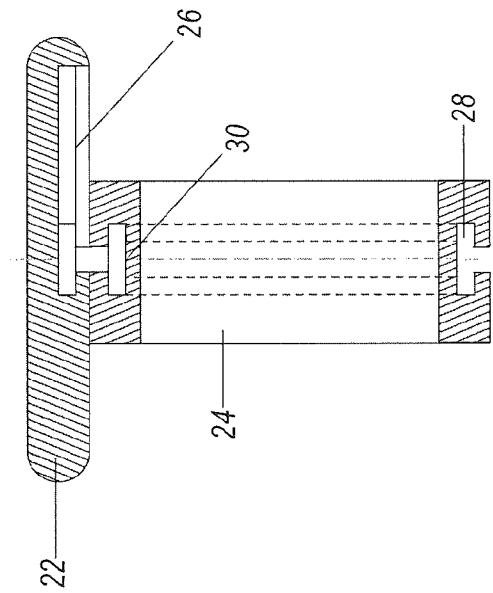
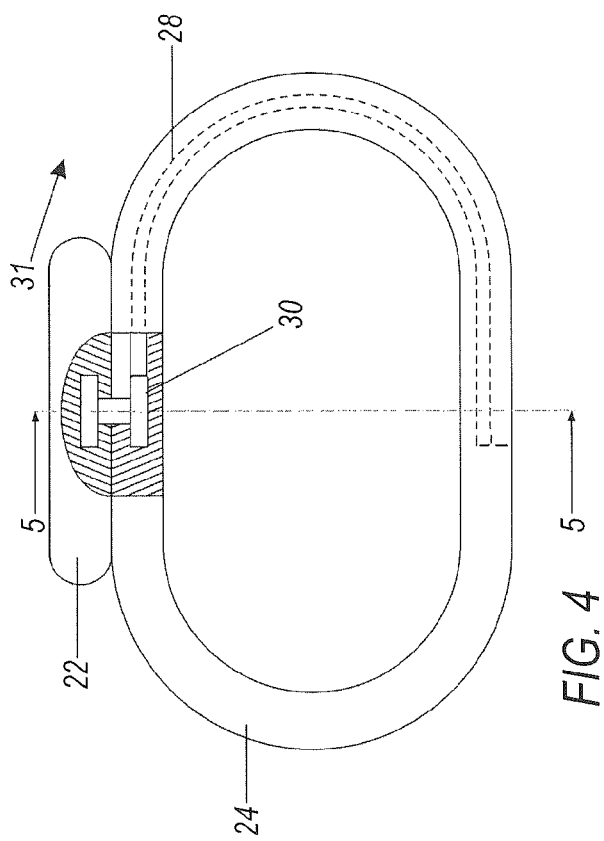
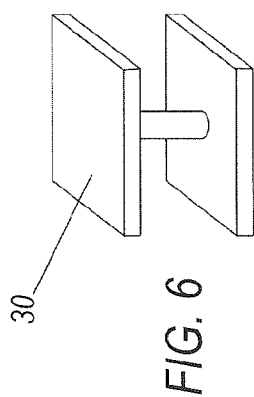

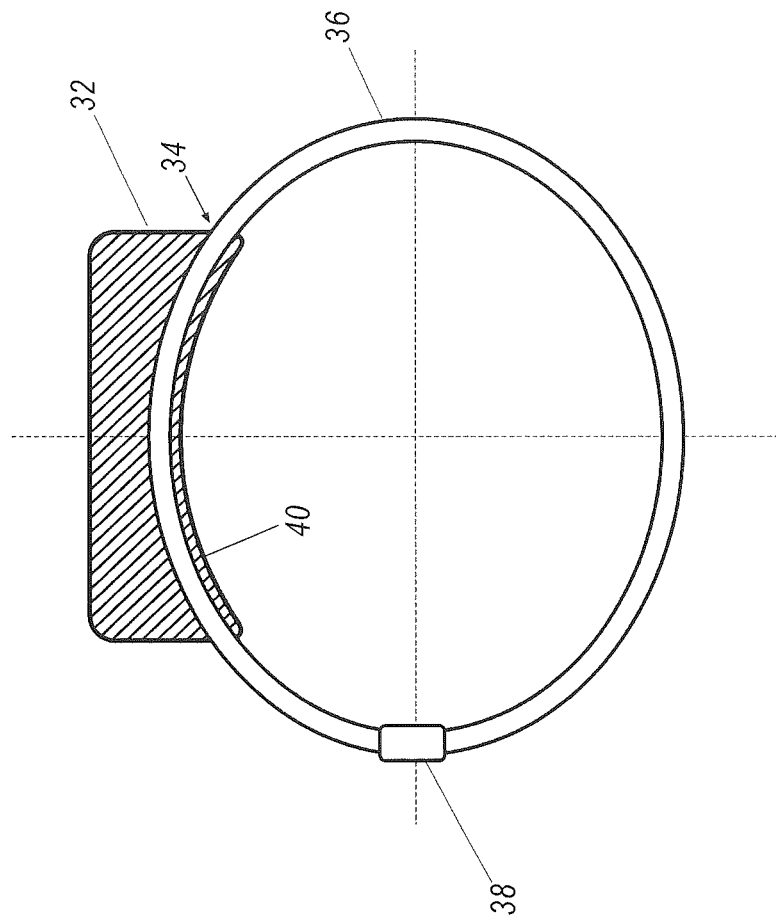
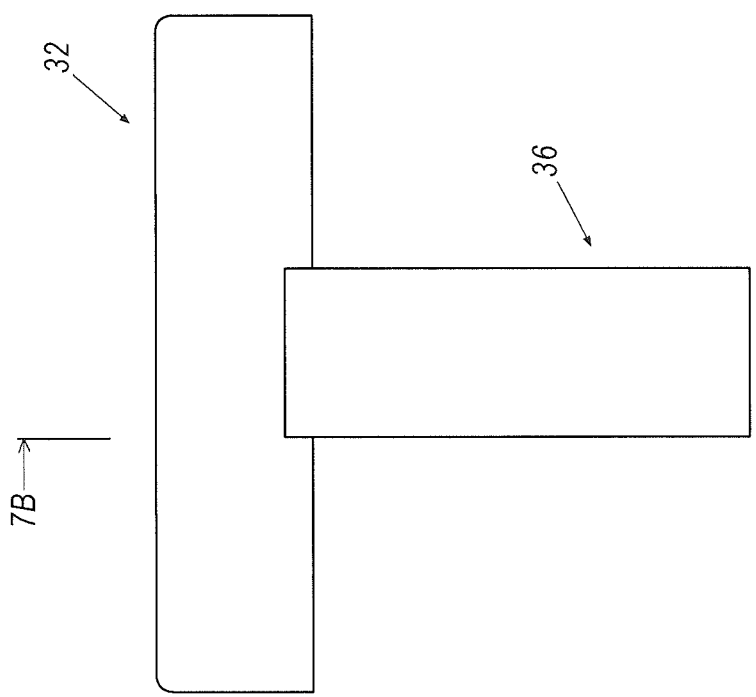
FIG. 7B
FIG. 7A

WRIST-WORN MOBILE TELEPHONE

CROSS-REFERENCE TO RELATED APPLICATIONS

This application is a U.S. National Phase continuation-in-part application of PCT/RU2011/000956 filed on Dec. 5, 2011 claiming priority to RU2010149515 filed on Dec. 6, 2010, the both applications being hereby incorporated by reference in their entirety.

TECHNICAL FIELD

The following description generally relates to the field of telecommunications, more specifically—to mobile communication devices, and even more particularly to wrist mobile phone, which can be widely used with various types of wireless telecommunication systems.

DESCRIPTION OF RELATED ART

Known in the art has been a multi-sectional wrist-worn mobile telephone comprising a body and a lid with a speaker, the lid being mounted on the lateral side of the body (see WO00/78011 A2, H04M, dated Dec. 21, 2000, p. 61, FIG. 24a).

The apparatus that due to the multi-sectional lid brings the speaker closer to fingers, when the lid is open, seems inconvenient in use because of the large number of joints serving to connect the lid to the body.

In the Russian Federation patent No 2237377 ("An apparatus for a quick and easy use of a small-size cellphone", H04M1/11, published on Apr. 20, 2004), there has been disclosed a wrist mobile phone comprising a body and a lid with an earphone. The phone is attached to a wrist watch band by means of a fixing device A significant disadvantage of the abovementioned mobile telephone with the conventional arrangement of a lid and a speaker at the top of the phone body is that it is bulky.

Also known prior art, as far as the technical concept goes, is represented by a wristwatch-type mobile phone mounted on a wrist strap and equipped with a speaker and a microphone (see "Wristwatch radiotelephone with deployable voice port", U.S. Pat. No. 5,467,324 of Nov. 14, 1995). The disadvantage of the abovementioned design is believed to be the complexity of the telephone, which forms, in aggregation with a wristband, a transceiver system, and its inconvenience in use because of having telescopic parts and forcing the user to necessarily move his/her hand back and forth from mouth to ear while speaking on the telephone.

U.S. Pat. No. 3,846,976 of Nov. 12, 1974 discloses a multi-sectional expandable wristband, particularly for wristwatches, with a row of connected links. The disclosure does not provide for moving the watches around or along the wrist since this objective is neither stated nor pursued or taught.

The closest prior art is believed to be wrist-carried radiotelephone according to U.S. Pat. No. 6,212,414 of Apr. 3, 2001. The radiotelephone, operable without removing from a user's wrist, comprises a housing including a display and a battery, and a wristband having a plurality of rigid and flexing portions. The flexing portions mechanically connect the rigid portions. The wristband is electrically and mechanically coupled to the housing. The radiotelephone circuitry is distributed within the rigid portions of the wristband and is interconnected through the flexing portions of the wristband. The circuitry is coupled to the display and the battery through the wristband. The disadvantages of this patented structure from the point of view of the disclosure being discussed herein lie in the complexity of the radiotelephone presenting a transceiver system including the wristband and inconvenience in use due to having pullout elements in the structure.

SUMMARY

The object of the structure disclosed herein is to provide a wrist worn mobile telephone which is easy to use in any position on the wrist and does not have to be taken off the wrist during the conversation. It is necessary to provide freedom of movement for a hand while the phone is on the outer side of the wrist in a sleep mode and the ability to easily move the phone to the inner part of the palm in order to conveniently put it to a person's ear during the conversation since it is more comfortable to put a palm to one's ear than a wrist.

The technical result that is achieved with the use of the wrist mobile phone being discussed herein is the improvement of the ear-speaker contact and convenience in use either when the hand is placed across the ear in a natural way with the phone attached to a resiliently stretchable wristband or in any other comfortable placement of the phone movable around and along the wrist.

To achieve the above object, the abovementioned wrist-worn mobile telephone includes a body and a wristband. The body of the phone with a microphone and speaker is attached to the wristband. The wristband is placed on the arm such that it can move around and along the wrist with the phone.

The wristband can be made resiliently stretchable.

The wristband can be made multi-sectional.

The wristband can be made with a groove, with a holding clip, rigidly attached to the body of the phone with one of its ends, inserted into the groove with another of its ends.

A through slot can be made in the body of the phone so that the wristband be fed through the slot.

Additionally, an inner side of the body of the phone in contact with the wrist can be shaped concave to generally follow the form of the wrist, whereas the through slot can be longitudinally shaped to generally follow the shape of the inner side of the body.

The inner side of the body of the phone can be made coarse.

A search among the available sources of scientific and technical information failed to uncover information of a similar wrist-worn mobile phone—an engineering solution whose distinctive features are in coincidence with all features of the described wrist-worn mobile phone. This makes the structure being discussed herein meeting the "novelty" and "inventive level" criteria. And inasmuch as a conventional arrangement of the mobile phone can be easily changed to the arrangement being disclosed herein, this wrist-worn mobile phone has "industrial applicability".

BRIEF DESCRIPTION OF DRAWINGS

All other objects, features, and advantages of the present disclosure will be better understood from the ensuing description accompanied by the following drawings, in which FIGS. 4 and 5 show front and side views of the wrist-worn telephone using a groove and a holding clip FIG. 6 illustrates the holding clip, and FIGS. 7a and 7b depict the version with the phone made slidable along the wristband.

DETAILED DESCRIPTION

Figure 1:
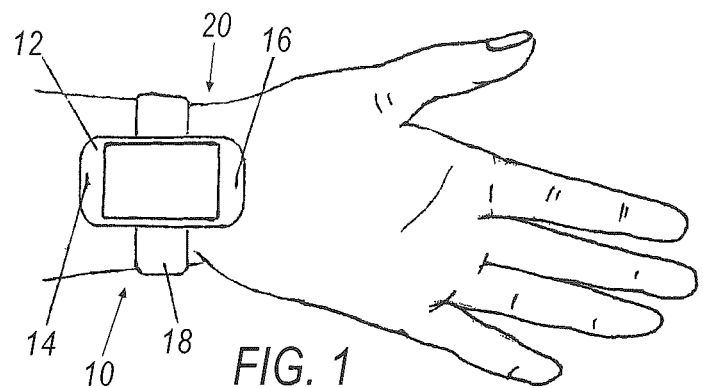
FIG. 1 is a general arrangement of the telephone according to the present disclosure ready for conversation.
Figure 2:
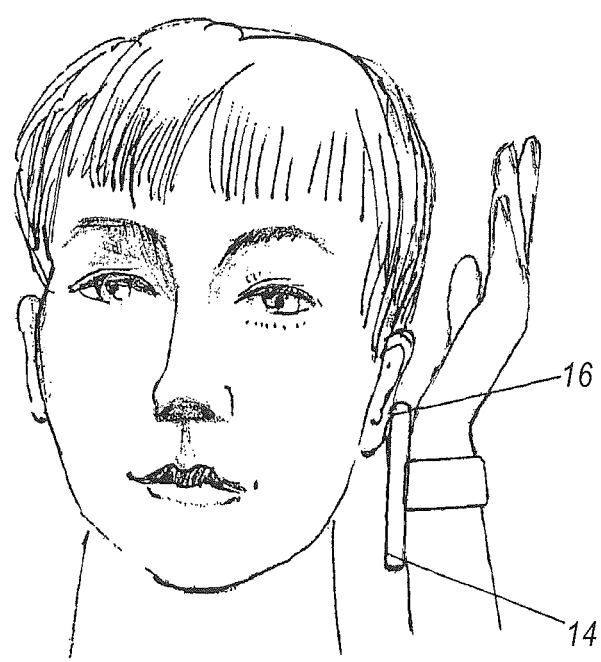
FIG. 2 shows the overall view during the telephone conversation, FIG. 3—the overall view of a telephone in sleep mode on the outer of the wrist
Figure 3:

The basic concept of the stricture being discussed herein is to provide a wrist-worn mobile phone that can be easily and conveniently moved relative to the wrist from a non-working position to a working one. Referring now to FIGS. 1-3, the wrist-worn mobile phone 10 according to the present disclosure comprises a body 12 with a microphone 14 and a speaker 16, and a wristband 18. By way of example of the wristband, a multi-sectional resiliently stretchable wristband shown in www.zrcbracelets.com/en/les-extensibles/ can be used and the body can be attached to the wristband in a conventional way using lugs on the body (not shown). By and large, other types of stretchable wristbands, and even a conventional wrist strap non-tightly placed on the wrist would serve the purpose of having the mobile phone movable around the wrist. The wristband 18 is put on the wrist 20 and adapted to move around and along the wrist. This becomes possible due to the ability of the wristband to stretch and slide on the wrist with its smooth inner surface. On the other hand, the inner surface of the body 12 can be made coarse. The phone can be easily moved along and around the wrist by raising the coarse inner surface of the body over the wrist to thereby slightly stretch the wristband. It is convenient to wear the phone in a sleep mode and dial the number when the body 12 is located on the outer or lateral side of the wrist. To start conversation, it is easy to move the phone to the inner side of the wrist by rotating it around the wrist and moving it toward to user's fingers so that the speaker 16 be found near the palm edge. This arrangement of the parts of the phone allows more convenient use of this wrist-watch type device as while speaking on the phone, one can find the most convenient position of the arm, palm edge with the speaker adjacent to one's ear and the wrist with the microphone adjacent to the mouth. It is not necessary for the user to change the position of the phone while speaking.

Referring now to FIGS. 4-6, another version of the same basic concept of the wrist-worn mobile phone comprises a body 22 of the phone attached to a wristband 24. A T-shape groove 26 is formed in the body (it can be realized, for example, by adding a pad (not shown) to the inner surface of the body with the groove made therein), and a T-shape groove 28 is provided in the wristband 24. A holding clip 30 inserted in the grooves 26 and 28 allows the body 22 to move in the direction shown by arrow 31 relative to the wristband 24 for the above-described purposes. For that version, the wristband 24 can be made of a compact flexible material, such a polyethylene, capable of receiving a T-shape groove. This groove 28 can go halfway around the wristband as illustrated by FIG. 4 though this is not a limitation of the concept.

Still another version of the basic concept of a wrist-worn mobile phone according to the present disclosure is illustrated by FIGS. 7a-7b. Shown there is a body 32, in which, close to its inner surface, a through slot 34 is made. The slot 34 can have, for example, a rectangular cross-section. Through this slot 34, a wristband 36 is fed with a small clearance in such a way that the body can be moved relative the wristband. A snap 38 to unlock the wristband can be provided. Conveniently, an inner side 40 of the body 32 of the phone in contact with the wrist can be shaped concave to generally follow the form of the wrist, whereas the through slot 34 can be longitudinally shaped bent to generally follow the shape of the inner side of the body. For better holding, the inner side 40 can be made coarse. Raising the body above the wrist, the user can easily move it around the wrist along the wristband, or along the wrist with the wristband.

It is an advantage of the presented wrist-worn mobile phone that it is easy to use (during the conversation) without extra Bluetooth®-type earphones, which results from the phone made movable relative to the wrist and/or the wristband.

The disclosed structure of wrist-worn mobile phone prevents it from being dropped and damaged. There is no need to use sound call, which often disturbs and annoys other people. The vibration signal is enough since the telephone is on the wrist.

It is to be understood that the phraseology or terminology employed herein is for the purpose of description and not of limitation. Accordingly, the disclosure is intended to embrace all such alternatives, modifications, equivalents and variations as fall within the broad scope of the appended claims.

The invention claimed is:

1. A wrist-worn mobile phone comprising a body of the phone and a wristband, the body with a microphone and a speaker being attached to the wristband and adapted to be movable around the wrist, wherein the wristband is made with a groove, and a holding clip attached to the body of the phone with one of its ends is inserted into the groove with another of its ends.

2. A wrist-worn mobile phone comprising a body of the phone and a wristband, the body with a microphone undo speaker being attached to the wristband and adapted to be movable around the wrist, wherein the body of the phone is made with a through slot therein, and the wristband is fed through the slot and wherein an inner side of the body of the phone in contact with the wrist is shaped concave to generally follow the form of the wrist, and the through slot is longitudinally shaped to generally follow the shape of the inner side of the body of the phone.

3. The wrist-worn mobile phone as claimed in claim 2, wherein the inner side of the body of the phone is made coarse.

4. A wrist-worn mobile phone comprising a body of the phone and a wristband, the body with a microphone and a speaker being movably attached to the wristband, whereby the phone is able to slide along the wristband, wherein the wristband is made with a groove, and a holding clip rigidly attached to the body of the phone with one of its ends is inserted into the groove with another of its ends.

5. The wrist-worn mobile phone as claimed in claim 4, wherein the groove is made halfway around the wristband.

6. A wrist-worn mobile phone comprising a body of the phone and a wristband, the body with a microphone and a speaker being movably attached to the wristband, whereby the phone is able to slide along the wristband, wherein the body of the phone is made with a through slot therein, and the wristband is fed through the slot, and wherein an inner side of the body of the phone in contact with the wrist is shaped concave to generally follow the form of the wrist, and the through slot is longitudinally shaped to generally follow the shape of the inner side of the body of the phone.

* * * * *